UNITED STATES PATENT OFFICE.

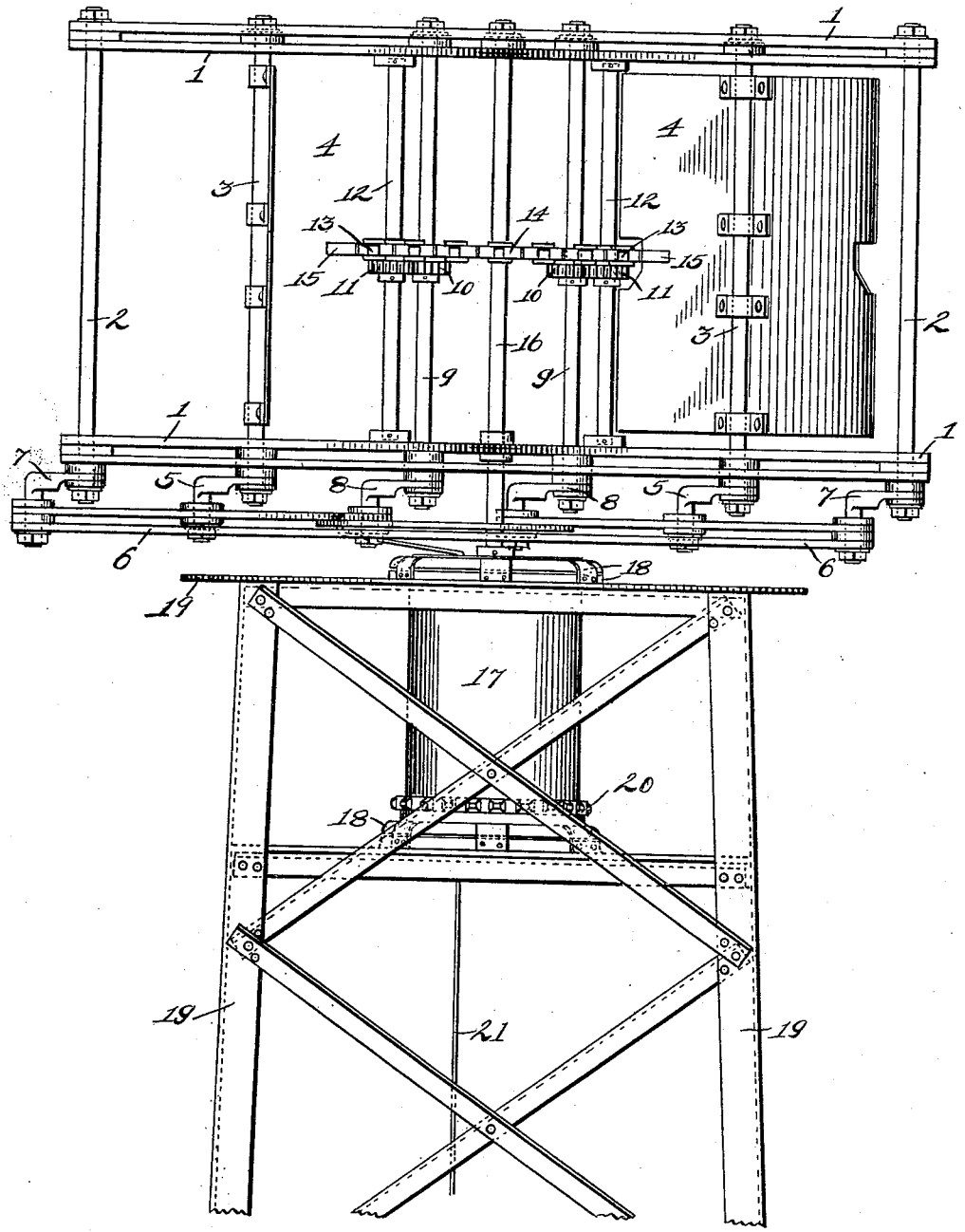

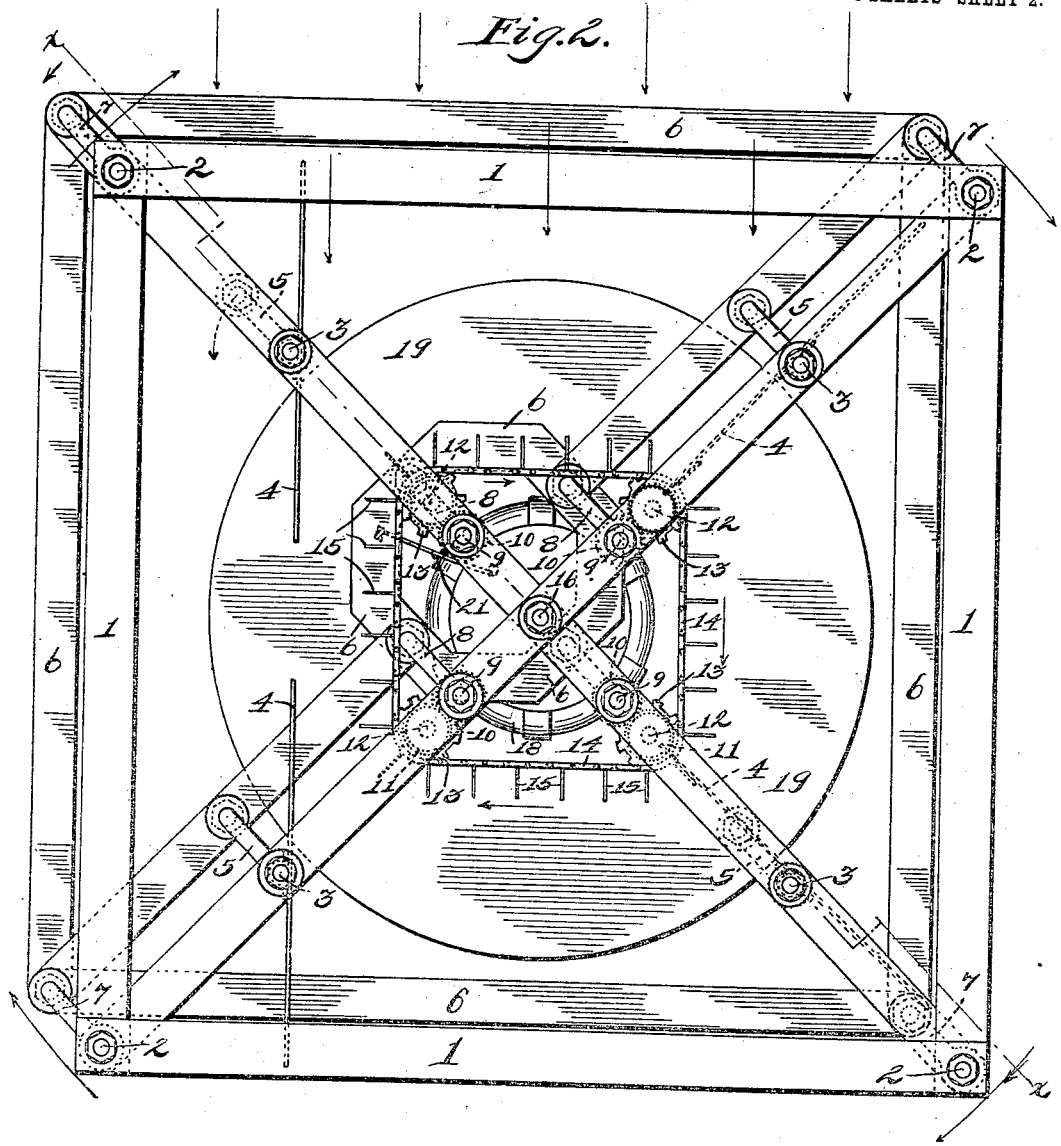

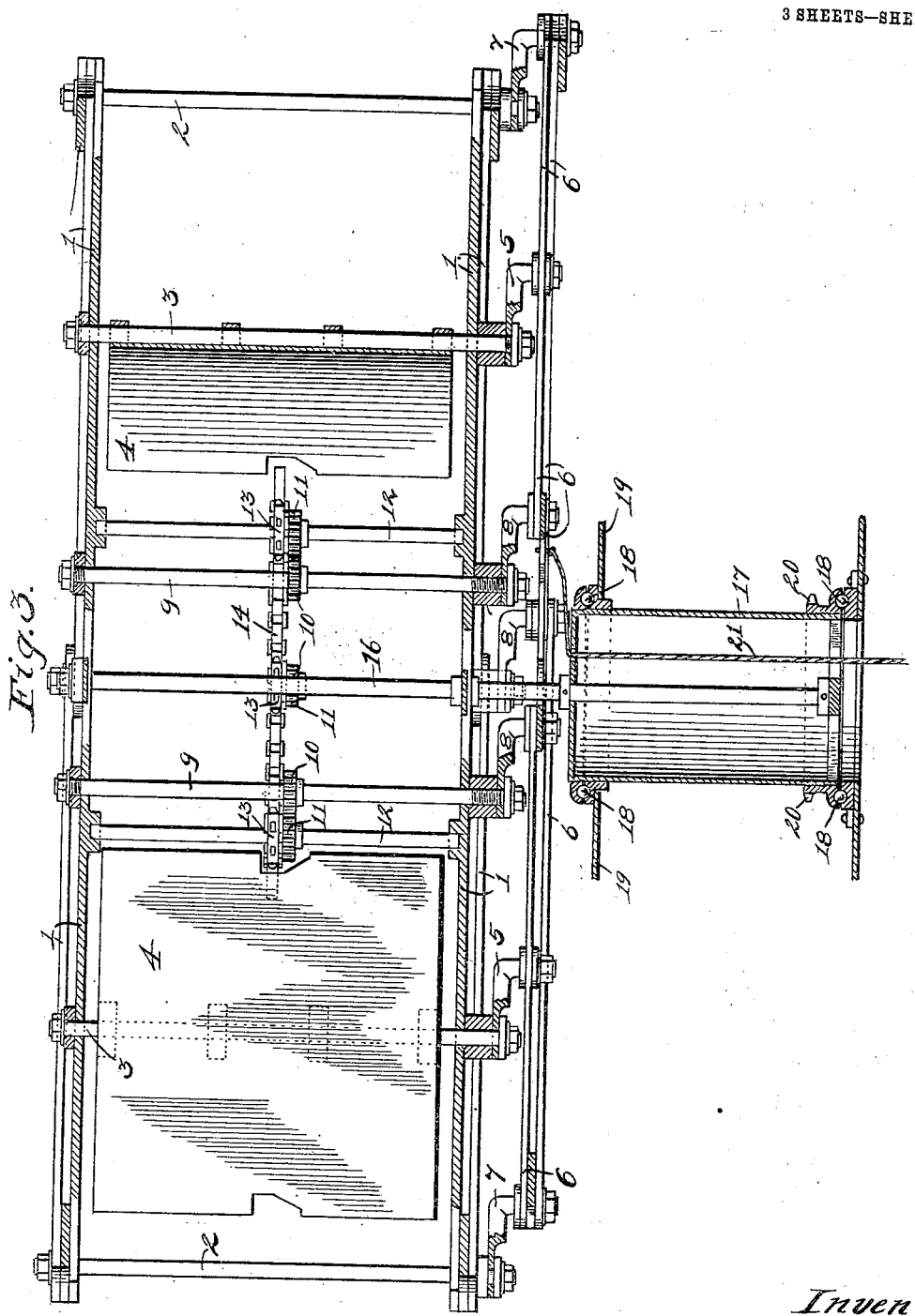

ALFRED M. VOLD, OF CHICAGO, ILLINOIS.

WINDMILL.

961,271. Specification of Letters Patent. Patented June 14, 1910.

Application filed February 14, 1910. Serial No. 543,837.

*To all whom it may concern:*

Be it known that I, ALFRED M. VOLD, a citizen of the United States, residing at Chicago, county of Cook, and State of Illinois, have invented certain new and useful Improvements in Windmills, of which the following is a specification.

My invention relates to improvements in wind mills and has for its object the production of a wind mill of simple construction and efficient in its operation.

The invention consists in the combination and arrangement of parts hereinafter described and claimed.

The invention will be best understood by reference to the accompanying drawings forming a part of this specification, and in which, Figure 1 is a side elevation of a wind mill embodying my invention, Fig. 2 is a top plan view of the same, and Fig. 3 is a section on line x—x of Fig. 2.

The preferred form of construction as illustrated in the drawings comprises a rigid main rotatable power frame consisting of upper and lower members 1 connected together at the corners by means of vertical rods or struts 2. Shafts 3 are rotatably mounted in frame 1 and carry wind mill blades 4 fixed thereto. Each of the shafts 3 carries at its lower end a crank arm 5, one of said crank arms being fixed to its corresponding shaft by screw threads 5' and the other crank arms being loose or free to rotate thereon. A supplemental oscillatory frame 6 is pivotally secured to the free ends of crank arms 5 being also supported by outer and similar crank arms 7 loosely mounted on struts 2. The frame 6 is also pivotally connected to the ends of crank arms 8 which are fixed to a series of shafts 9 rotatably mounted in frame 1. Each of these shafts 9 carries a spur gear 10 meshing with a spur gear 11 fixed to a shaft 12 rotatably mounted in frame 1. Each of the shafts 12 also carries a sprocket wheel 13 over which passes a sprocket chain 14 carrying outwardly projecting stops or lugs 15. Frame 1 is carried by a central shaft 16 supported and carried by a drum 17 rotatably mounted upon ball bearings 18 in a suitable frame or tower 19. Drum 17 carries a sprocket wheel 20 from which power may be taken. A cord or cable is extended upwardly through drum 17 and connected at its upper end with frame 6 and by means of which said frame may be tied or anchored against oscillation.

In operation with the wind blowing in the direction indicated in Fig. 2 the natural tendency of blades 4 is to assume a position parallel with said wind. Thus the blade carrying the fixed crank arm 5 tends to maintain its position parallel with the wind so that as frame 1 rotates a rotating motion relatively to frame 1 will be imparted to supplemental frame 6. This rotation will be communicated to shafts 9 through crank arms 8 thus causing sprocket chain 14 to travel in the direction indicated by the arrows in Fig. 2. The arrangement is such that the loose blades will be engaged by stops 15 on chain 14 and held in the positions indicated at the right of Fig. 2 in which positions the force of the wind is exerted thereon to cause rotation of frame 1, and said blades on the left of Fig. 2 are released from chain 14 to permit them to assume a position parallel to the direction of the wind and thus offer little resistance to the rotation of the frame on that side. This engaging and releasing action of the blades takes place in the same manner as the teeth of intermeshing cog wheels engage and release, the notches in the sides of the blades facilitating such action. Thus it will be seen that the frame 1 will be caused to rotate continuously and in a constant direction by the action of the wind on the blades held by said chain. This rotation is communicated to drum 17 and power may be taken therefrom by means of sprocket 20. To stop the rotation of the wind mill cable 21 is tied or otherwise anchored to hold frame 6 against oscillations and thus to prevent travel of chain 14. This will stop the rotation of the wind wheel.

While I have illustrated and described the preferred construction for carrying my invention into effect this is capable of variation or modification without departing from the spirit of my invention. I therefore do not wish to be limited to the exact details of construction set forth but desire to avail myself of such variations and modifications as come within the scope of the appended claims.

Having described my invention what I claim as new and desire to secure by Letters Patent is:

1. In a wind mill the combination of a rotatable power frame; a series of blades mounted to rotate in said frame on vertical axes; a crank arm fixed to one of said blades; a sprocket chain carrying stops adapted to contact with the inner sides of said blades and control their positions; and an operative connection between said crank arm and said sprocket chain, substantially as described.

2. In a wind mill the combination of a rotatable power frame; a series of blades mounted to rotate in said frame on vertical axes; a crank arm fixed to one of said blades; a supplemental frame pivotally connected with said crank arm; a series of supplemental crank arms rotatably mounted on said power frame and pivotally supporting said supplemental frame; a sprocket chain carrying stops adapted to contact with the inner sides of said blades and control their positions; and an operative connection between one of said supplemental crank arms and said sprocket chains, substantially as described.

3. In a wind mill the combination of a rotatable power frame; a series of blades mounted to rotate in said frame on vertical axes; a crank arm fixed to one of said blades; a supplemental frame pivotally connected with said crank arm; a series of supplemental crank arms rotatably mounted on said power frame and pivotally supporting said supplemental frame; a sprocket chain carrying stops adapted to contact with the inner sides of said blades and control their positions; a set of vertical shafts in said power frame carrying sprocket wheels for operating said chain; a set of operative vertical shafts geared to said first mentioned vertical shafts; and crank arms fixed to said operative vertical shafts and pivotally connected with said supplemental frame, substantially as described.

4. In a wind mill the combination of a rotatable power frame; a series of blades mounted to rotate in said frame on vertical axes; a crank arm fixed to one of said blades; a supplemental frame pivotally connected with said crank arm; a series of supplemental crank arms rotatably mounted on said power frame and pivotally supporting said supplemental frame; a sprocket chain carrying stops adapted to contact with the inner sides of said blades and control their positions; a set of vertical shafts in said power frame carrying sprocket wheels for operating said chain; a set of operative vertical shafts geared to said first mentioned vertical shafts; crank arms fixed to said operative vertical shafts and pivotally connected with said supplemental frame; a power drum carrying said power frame and mounted upon ball bearings; and means for taking power from said drum, substantially as described.

5. In a wind mill the combination of a rotatable power frame; a series of blades mounted to rotate in said frame on vertical axes; a crank arm fixed to one of said blades; a supplemental frame pivotally connected with said crank arm; a series of supplemental crank arms rotatably mounted on said power frame and pivotally supporting said supplemental frame; a sprocket chain carrying stops adapted to contact with the inner sides of said blades and control their positions; a set of vertical shafts in said power frame carrying sprocket wheels for operating said chain; a set of operative vertical shafts geared to said first mentioned vertical shafts; crank arms fixed to said vertical shafts and pivotally connected with said supplemental frame; a cable for anchoring said supplemental frame against movement; a power drum carrying said power frame and mounted upon ball bearings; and means for taking power from said drum, substantially as described.

In testimony whereof I have signed my name to this specification in the presence of two subscribing witnesses.

ALFRED M. VOLD.

Witnesses:
HELEN F. LILLIS,
JOSHUA R. H. POTTS.